United States Patent
Fujibayashi et al.

(10) Patent No.: US 7,859,214 B2
(45) Date of Patent: Dec. 28, 2010

(54) SYNCHRONOUS CONTROLLER

(75) Inventors: Kentaro Fujibayashi, Musashino (JP);
Tetsuo Hishikawa, Yamanashi (JP);
Takashi Idei, Fujiyoshida (JP)

(73) Assignee: Fanuc Ltd., Yamanashi (JP)

( * ) Notice: Subject to any disclaimer, the term of this patent is extended or adjusted under 35 U.S.C. 154(b) by 1418 days.

(21) Appl. No.: 11/297,425

(22) Filed: Dec. 9, 2005

(65) Prior Publication Data
US 2006/0125438 A1    Jun. 15, 2006

(30) Foreign Application Priority Data
Dec. 9, 2004  (JP) .............................. 2004-356603

(51) Int. Cl.
*G05B 19/18* (2006.01)

(52) U.S. Cl. ...................... 318/569; 318/85; 318/560

(58) Field of Classification Search ............... 318/85, 318/560, 567, 568.18, 569, 574, 595, 690, 318/721, 700, 779, 799, 437
See application file for complete search history.

(56) References Cited

U.S. PATENT DOCUMENTS

| | | | | |
|---|---|---|---|---|
| 5,812,432 | A | * | 9/1998 | Takizawa et al. ................ 703/8 |
| 5,859,515 | A | * | 1/1999 | Takizawa et al. ............. 318/560 |
| 6,897,626 | B2 | * | 5/2005 | Fujibayashi et al. ............ 318/85 |
| 6,909,938 | B2 | * | 6/2005 | Hishikawa et al. ........... 700/188 |
| 2002/0103567 | A1 | | 8/2002 | Hishikawa et al. |

FOREIGN PATENT DOCUMENTS

| | | |
|---|---|---|
| EP | 0 440 805 | 8/1991 |
| EP | 1 431 852 | 6/2004 |
| EP | 1 591 851 | 11/2005 |
| JP | 7302103 | 11/1995 |
| JP | 2697399 | 9/1997 |
| WO | 03/005135 | 1/2003 |

OTHER PUBLICATIONS

Japanese Office Action issued on Nov. 18, 2008 in corresponding Japanese Patent Application No. 2004-356603.
Extended European Search Report issued in corresponding European Patent Application No. 05257527.1 on Apr. 1, 2008.

* cited by examiner

*Primary Examiner*—Bentsu Ro
*Assistant Examiner*—Antony M Paul
(74) *Attorney, Agent, or Firm*—Staas & Halsey LLP (57) ABSTRACT

A synchronous controller capable of gently changing a synchronous multiplying factor and setting the gentleness of changing of the synchronous multiplying factor without shocking a machine. A block for gently changing the synchronous multiplying factor is added between blocks before and after the changing of the synchronous multiplying factor. Synchronous multiplying factors a and b before and after changing of the synchronous multiplying factor designated in the added block, a motion amount p of master axis, a motion amount of a slave axis, and a residual motion amount v of the master axis after the completion of changing the synchronous multiplying factor (or a preliminary motion amount u of the master axis from the start of motion of the block concerned to a position for the start of changing of the synchronous multiplying factor) are read out. A gradient of changing the synchronous multiplying factor and the preliminary motion amount u (or the residual motion amount v) are obtained based on these data. The slave axis is controlled based on the motion amounts u and v and the gradient of changing the synchronous multiplying factor. The synchronous multiplying factor is changed so gently that the machine cannot be shocked. The synchronous multiplying factor gradient can be settled depending on the designated data p, q and v (or u).

5 Claims, 4 Drawing Sheets

FIG. 8

SYNCHRONOUS CONTROLLER

BACKGROUND OF THE INVENTION

1. Field of the Invention

The present invention relates to a synchronous controller for synchronously drivingly controlling a plurality of axes.

2. Description of Related Art

Conventionally known is a synchronous controller that drivingly controls axes by moving a slave axis in a certain ratio to a motion amount of a master axis. In driving control by this synchronous controller such that a synchronous multiplying factor, a speed ratio between the master and slave axes, is changed, the speed of the slave axis sometimes may change suddenly, thereby shocking a machine to be subjected to synchronous control.

Figure 1:
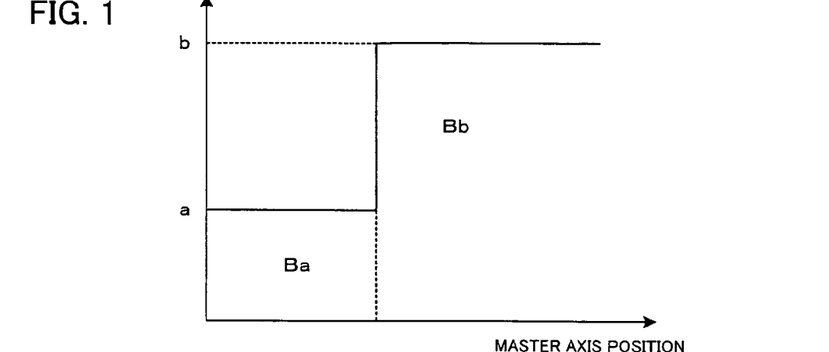
FIG. 1 is a diagram illustrating the way a synchronous multiplying factor is changed in synchronous control.

FIG. 1 is a diagram illustrating the way of changing the synchronous multiplying factor. In FIG. 1, the abscissa and ordinate axes represent the position of the master axis and a synchronous multiplying factor $\alpha$ of the slave axis, respectively. When the synchronous control is performed in a manner such that the slave axis is moved with the synchronous multiplying factor $\alpha=a$ with respect to the motion of the master axis in a block Ba, a command is issued to change the synchronous multiplying factor in a next block Bb so that the slave axis is driven with the synchronous multiplying factor $\alpha=b$. In this case, the synchronous multiplying factor $\alpha$ is greatly changed from "a" to "b", so that the speed of the slave axis suddenly changes. This change inevitably shocks the machine.

In a known system to cope with this, a motion command is outputted after being filtered lest a machine be shocked by a great speed change (change of a motion amount for a period concerned with respect to a motion amount for a preceding period), if any, as the synchronous multiplying factor is changed (see JP 2697399B).

SUMMARY OF THE INVENTION

The present invention provides a synchronous controller capable of gently changing a synchronous multiplying factor for synchronous control without shocking a machine and also capable of setting gentleness of changing the synchronous multiplying factor.

A synchronous controller of the present invention controls a master axis and a slave axis to be synchronized according to a synchronous multiplying factor as a speed ratio of the slave axis to the master axis. According to an aspect of the invention, the synchronous controller comprises: means for commanding a change of the synchronous multiplying factor from a first value to a second value; means for designating a motion amount of the master axis and a motion amount of the slave axis for the change of the synchronous multiplying factor, and a residual motion amount of the master axis after changing the synchronous multiplying factor; means for calculating a gradient of changing the synchronous multiplying factor and a preliminary motion amount of the master axis before changing the synchronous multiplying factor such that the designated motion amount of the slave axis has been completed and the synchronous multiplying factor has changed to the second value when the designated motion amount of the master axis is completed; and means for controlling motion of the slave axis with respect to the master axis according to the calculated gradient of changing the synchronous multiplying factor until the synchronous multiplying factor reaches the second value after the calculated preliminary motion amount of the master axis is completed.

According to another aspect of the invention, the synchronous controller comprises: means for commanding a change of the synchronous multiplying factor from a first value to a second value; means for designating a motion amount of the master axis and a motion amount of the slave axis for the change of the synchronous multiplying factor, and a preliminary motion amount of the master axis before changing the synchronous multiplying factor; means for calculating a gradient of changing the synchronous multiplying factor and a residual motion amount of the master axis after changing the synchronous multiplying factor such that the designated motion amount of the slave axis has been completed and the synchronous multiplying factor has changed to the second value when the designated motion amount of the master axis is completed; and means for controlling motion of the slave axis with respect to the master axis according to the calculated gradient of changing the synchronous multiplying factor until the synchronous multiplying factor reaches the second value after the designated preliminary motion amount of the master axis is completed.

According to still another aspect of the invention, the synchronous controller comprises: means for commanding a change of the synchronous multiplying factor from a first value to a second value; means for designating a motion amount of the master axis for the change of the synchronous multiplying factor; means for calculating a motion amount of the slave axis for the change of the synchronous multiplying factor such that the synchronous multiplying factor starts changing simultaneously with motion of the master axis for the designated motion amount and reaches the second value when the designated motion amount of the master axis is completed; and means for outputting the designated motion amounts of the master axis and the calculated motion amounts of the slave axis for the change of the synchronous multiplying factor.

According to still another aspect of the invention, the synchronous controller comprises: means for commanding a change of the synchronous multiplying factor from a first value to a second value; means for designating a motion amount of the slave axis for the change of the synchronous multiplying factor; means for calculating a motion amount of the master axis for the change of the synchronous multiplying factor such that the synchronous multiplying factor starts changing simultaneously with motion of the slave axis for the designated motion amount and reaches the second value when the designated motion amount of the slave axis is completed; and means for outputting the calculated motion amounts of the master axis and the designated motion amounts of the slave axis for the change of the synchronous multiplying factor.

According to still another aspect of the invention, the synchronous controller comprises: means for commanding a change of the synchronous multiplying factor from a first value to a second value; means for designating a motion amount of the master axis and a motion amount of the slave axis for the change of the synchronous multiplying factor, and a gradient of changing the synchronous multiplying factor; means for calculating a preliminary motion amount of the master axis before changing the synchronous multiplying factor and a residual motion amount of the master axis after changing the synchronous multiplying factor such that the designated gradient of changing the synchronous multiplying factor is obtained; and means for controlling motion of the slave axis with respect to the master axis according to the designated gradient of changing the synchronous multiplying factor until a remaining motion amount of the master axis is made equal to the calculated residual motion amount after the calculated preliminary motion amount of the master axis is completed.

Since the synchronous multiplying factor is gently changed, stable synchronous control can be performed without shocking a machine. Since the gradient of the synchronous multiplying factor can be adjusted to any desired value based on the designated data, moreover, the acceleration of the slave at the time of changing the synchronous multiplying factor can be restricted within a maximum acceleration by settling an upper limit speed of the master axis.

DETAILED DESCRIPTION

The principle of operation of the present invention will be described first. In synchronous control of the present invention, a block for gently changing a synchronous multiplying factor is added between blocks in which the synchronous multiplying factor is changed.

Figure 2:
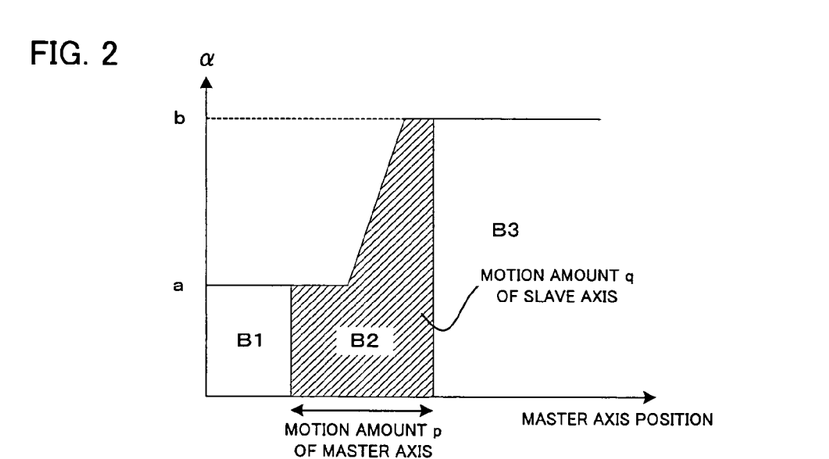
FIG. 2 is a diagram illustrating blocks in which a synchronous multiplying factor used in an embodiment of the present invention is gently changed.
Figure 3:
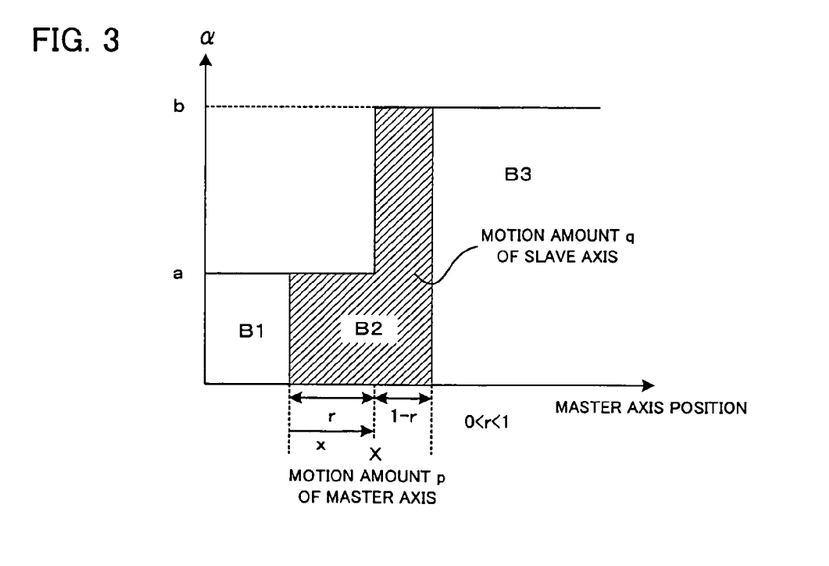
FIG. 3 is a reference diagram for illustrating the blocks in which the synchronous multiplying factor used in the embodiment of the invention is gently changed.

FIG. 2 is a diagram illustrating the change of the synchronous multiplying factor in the additional block for gently changing the synchronous multiplying factor. The abscissa axis represents the position of a master axis, while the ordinate axis represents a synchronous multiplying factor α of a slave axis, the speed ratio between the master axis and the slave axis. In a block B1, the slave axis is driven with the synchronous multiplying factor α=a with respect to the master axis. In block B3, the synchronous multiplying factor α is changed into "b", so that a block B2 in which the synchronous multiplying factor α is gently changed is provided between the blocks B1 and B3. In the example shown in FIG. 2, a function for changing the synchronous multiplying factor is a linear function. In the block B2 where the synchronous multiplying factor is changed, a path along which the synchronous multiplying factor α is changed need not always linearly change according to a linear function such as the one shown in FIG. 2. Alternatively, the function may be any other function that meets an area condition S1=S2 (mentioned later) shown in FIG. 4.

Let it now be supposed that the position of the master axis at an changing point where the synchronous multiplying factor α is changed from "a" into "b" without being gently changed is "X", the amount of motion of the master axis in the block B2 where the synchronous multiplying factor α is gently changed is "p", and the amount of motion of the slave axis covered as the master axis moves for the amount "p" is "q". The motion amount q of the slave axis is represented by each of hatched areas shown in FIGS. 2 and 3. A ratio r of the amount of motion from a starting point of motion in the block B2 with the motion amount p at "1" is obtained. The motion amount q of the slave axis is expressed as follows:

$$q = apr + bp(1-r) \quad (1),$$

so that we obtain $$r = \frac{bp - q}{(b-a)p}. \quad (2)$$

A motion amount x of the master axis from the starting point of the block B2 to the position X is expressed as follows:

$$x = pr = \frac{bp - q}{b - a}. \quad (3)$$

Figure 4:
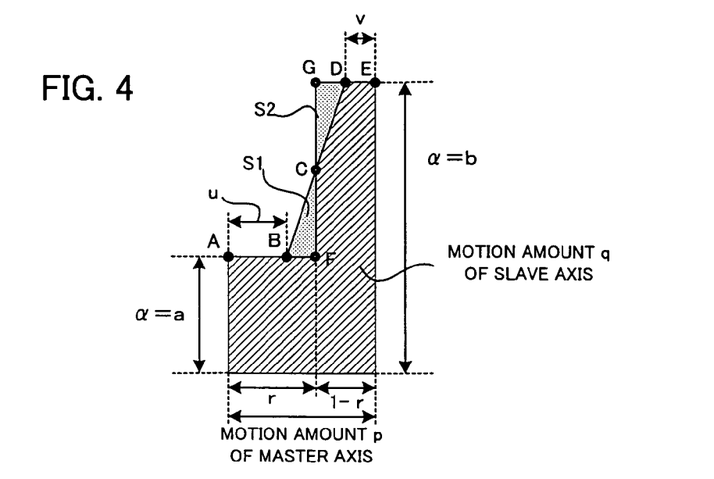
FIG. 4 is a diagram illustrating the principle of operation according to a first embodiment of the invention.

FIG. 4 is a diagram illustrating the principle of operation according to a first embodiment of the present invention. In this case, the synchronous multiplying factor α of the slave axis is gently linearly changed according to a linear function from α=a to α=b within the motion amount p of the master axis in the block B2.

In FIG. 4, a point A is the starting point of the block B2; B, a start point of changing the synchronous multiplying factor α; D, a point for the synchronous multiplying factor α=b; E, a motion end point of the block B2; and C, a point for a synchronous multiplying factor "(b−α)/2" of the slave axis in the master axis position X reached when the synchronous multiplying factor α is changed from "a" into "b". The point "C" is a point at which the areas designated by S1 and S2 in FIG. 4 are equal. A point F is a point at which the synchronous multiplying factor α is a in the master axis position X. A point G is a point at which the synchronous multiplying factor α is b in the master axis position X. The area S1 is equal to the area of a triangle BFC, while the area S2 is equal to the area of a triangle DGC.

As seen from comparison between FIGS. 3 and 4, the motion amount q of the slave axis covered as the master axis moves for the amount p makes no difference. If the synchronous multiplying factor α is gently changed, as shown in FIG. 4, the motion amount of the slave axis during the period between the start of changing the synchronous multiplying factor and the arrival of the master axis at the position X shown in FIG. 4 is smaller than the one shown in FIG. 3 by a margin corresponding to the area S2. Thus, the motion amounts S1 and S2 of the slave axis that vary across the master axis position X are equalized, although the synchronous multiplying factor is changed at a stroke in the case shown in FIG. 3. If the motion amounts S1 and S2 are equal to each other, the synchronous multiplying factor α may be changed according to any other function than a linear function.

Let it be supposed that an amount of motion of the master axis (from the point A to the point B) in the block B2 before the start of changing the synchronous multiplying factor α is "u" and a residual amount of motion of the master axis (from the point D to the point E) during the period between the completion of changing the synchronous multiplying factor α and the end of motion of the block B2 is "v", as shown in FIG. 4.

In FIG. 4, the amount of motion of the master axis from the point A to the point D is (p−v) or pr+(pr−u), so that we have p−v=pr+(pr−u).

Rearranging this equation with respect to u or v, we obtain $$u = v + 2pr + p = v + \frac{2(bp - q)}{b - a} - p, \quad (4)$$

$$v = u - 2pr + p = u - \frac{2(bp - q)}{b - a} + p, \quad (5)$$

where u and v must satisfy the relationships given by equations (6) and (7) as follows:

$$0 \le u \le pr = \frac{bp - q}{b - a}, \quad (6)$$

$$0 \le v \le p(1 - r) = \frac{q - ap}{b - a}. \quad (7)$$

Thus, a gradient β of the synchronous multiplying factor α is obtained according to the following equation (8) by designating the unchanged and changed values a and b of the synchronous multiplying factor α, the motion amount p of the master axis in the block B2, the motion amount q of the slave axis, and the residual amount v of motion of the master axis during the period between the completion (point D) of changing the synchronous multiplying factor α and the end (point E) of motion of the block B2:

$$\beta = \frac{b - a}{2[p(1 - r) - v]} \quad (8)$$

$$= \frac{b - a}{2\{p[1 - (bp - q)/(b - a)p] - v\}}$$

$$= \frac{(b - a)^2}{2[q - ap - (b - a)v]}$$

Thus, the motion amount u of the master axis before the start of changing the synchronous multiplying factor α is obtained according to equation (4) based on the designated values a, b, p and q, and the gradient β of the synchronous multiplying factor α is obtained according to equation (8). If the synchronous multiplying factor α is gently changed based on these data, synchronous control of higher quality can be performed without shocking a machine and without failing to secure a motion distance of the slave axis (covered as the master axis moves for the amount v) such that an overshoot, if any, of a servomotor for the slave axis can be absorbed.

Further, the gradient β of the synchronous multiplying factor α is obtained according to the following equation (9) by designating the unchanged and changed values a and b of the synchronous multiplying factor α, the motion amount p of the master axis in the block B2, the motion amount q of the slave axis, and the amount u of motion of the master axis during the period between the start of motion of the block B2 and the start of change of the synchronous multiplying factor α:

$$\beta = \frac{b - a}{2(pr - u)} \quad (9)$$

$$= \frac{b - a}{2\{p[(bp - q)/(b - a)p] - u\}}$$

$$= \frac{(b - a)^2}{2[bp - q - (b - a)u]}$$

In this case, the motion amount v of the master axis during the period between the completion (point D) of changing the synchronous multiplying factor α and the end (point E) of motion of the block B2, and the gradient β of the synchronous multiplying factor α is obtained according to the following equation (9).

Figure 5:
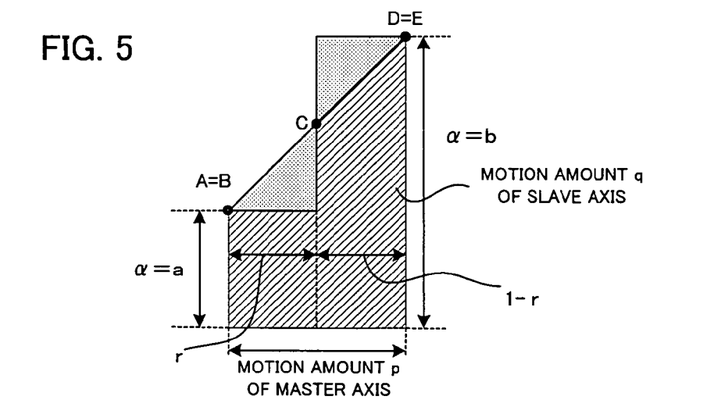
FIG. 5 is a diagram illustrating the principle of operation according to a second embodiment of the invention.

FIG. 5 is a diagram illustrating the principle of operation according to a second embodiment of the present invention. If the aforesaid ratio r is ½, u=v is given, as is evident from equation (4) or equation (5). In this embodiment, this value is set to "0". In this example, moreover, changing of the synchronous multiplying factor α is started at the start of motion of the block B2 and ended when the motion of the block B2 terminates, whereupon the synchronous multiplying factor α=b is obtained.

According to equation (4) or (5), in this case, we obtain $$p = \frac{2(bp - q)}{b - a}. \quad (10)$$

Rearranging this equation (10), the motion amount q of the slave axis and the motion amount p of the master axis can be expressed as follows:

$$q = \frac{a + b}{2} p, \quad (11)$$

$$p = \frac{2}{a + b} q. \quad (12)$$

If the motion amount p of the master axis in the block B2 is settled with the ratio r at 0.5 and u=v=0, the motion amount q of the slave axis in the block B2 is automatically settled according to equation (11). If the motion amount q of the slave axis in the block B2 is settled, moreover, the motion amount p of the master axis in the block B2 is automatically settled according to equation (12). As is evident from equations (8) and (9), furthermore, the gradient β of the synchronous multiplying factor α is obtained as follows:

$$\beta = \frac{b - a}{p}. \quad (13)$$

Figure 6:
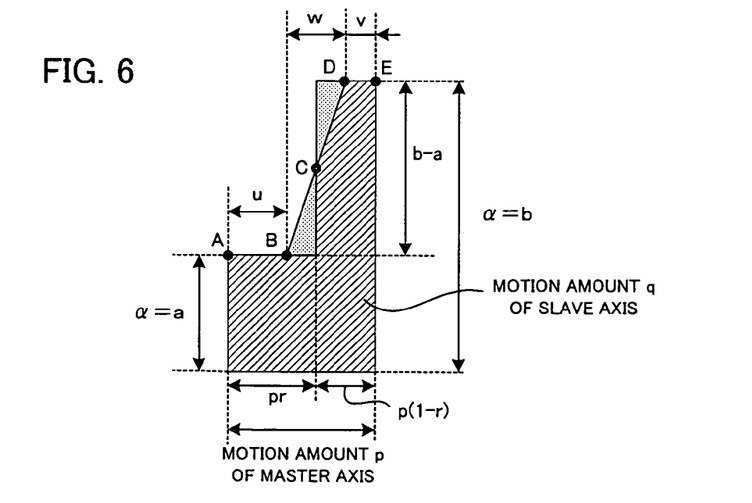
FIG. 6 is a diagram illustrating the principle of operation according to a third embodiment of the invention.

FIG. 6 is a diagram illustrating the principle of operation according to a third embodiment of the present invention. In the foregoing embodiments, the gradient β of the synchronous multiplying factor α is obtained by designating the amount u of motion of the master axis in the block B2 before the start of changing the synchronous multiplying factor α or the residual amount v of motion of the master axis during the period between the completion of changing the synchronous multiplying factor and the end of motion of the block B2. According to this third embodiment, however, the gradient β of the synchronous multiplying factor α is designated.

Since the gradient of acceleration has an upper limit, depending on the machine to be controlled, the control is performed by designating the gradient β smaller than the gradient of a maximum feasible synchronous multiplying factor based on this maximum acceleration.

Thus, the motion amounts u and v can be obtained by designating the synchronous multiplying factor α=a in the block B1 before the changing of the synchronous multiplying factor, the synchronous multiplying factor α=b in the block B3 after the changing of the synchronous multiplying factor, the respective motion amounts p and q of the master and slave axes in the block B2 between the blocks B1 and B3, and the gradient β for changing the synchronous multiplying factor.

If the amount of motion of the master axis in a synchronous multiplying factor changing zone is w, β is $$\beta=(b-a)/w,$$

so that w is $$w=(b-a)/\beta.$$

Further, u and v are given by $$u = pr - w/2 \quad (14)$$
$$= \frac{bp-q}{b-a} - \frac{b-a}{2\beta}$$

$$v = p(1-r) - w/2 \quad (15)$$
$$= \frac{p-aq}{b-a} - \frac{b-a}{2\beta}$$

Furthermore, the motion amount w must fulfill the following conditions based on the value of the ratio r:

$$0 \leq w \leq 2pr \text{ (where } 0 \leq r \leq 0.5),$$

$$0 \leq w \leq 2(1-r)p \text{ (where } 0.5 \leq r \leq 1).$$

The above is a description of the principles of operation according to the individual embodiments of the present invention. The following is a description of one embodiment of the invention.

Figure 7:
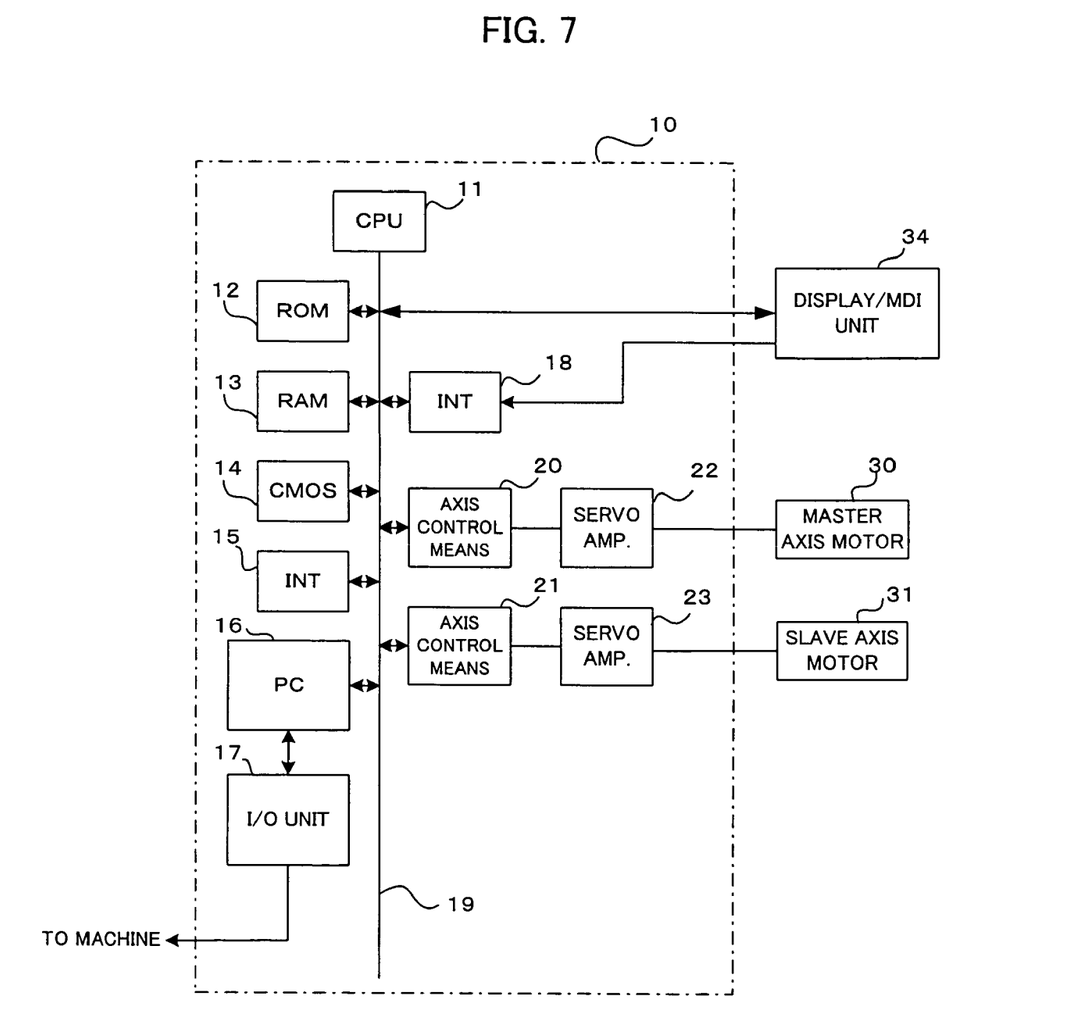
FIG. 7 is a block diagram showing principal parts of a synchronous controller for executing each embodiment of the invention.

FIG. 7 is a block diagram of one embodiment of a synchronous controller for carrying out the synchronous control described above. In this embodiment, a numerical control device is used as the synchronous controller. A CPU 11 of a synchronous controller 10 is a processor for generally controlling the control device. The CPU 11 reads system programs in a ROM 12 through a bus 19 and controls the entire control device in accordance with the system programs. A RAM 13 is stored with temporary calculation data, display data, and various data that are inputted by an operator through a display/MDI unit 34. A CMOS memory 14 is a nonvolatile memory that is backed up by a battery (not shown) so that its storage state can be maintained even when the synchronous controller 10 is switched off. The CMOS memory 14 is stored with an operation program that is read through an interface 15, an operation program inputted through the display/MDI unit 34, and the like.

The interface 15 enables the synchronous controller 10 to be connected to external equipment such as an adapter. An operation program and the like are read from the external equipment side. A PC (programmable controller) 16 outputs a signal for control through an I/O unit 17 to an auxiliary device of the machine according to a sequence program in the synchronous controller 10.

The display/MDI unit 34 is a manual data input device provided with a display device, a keyboard, etc. An interface 18 receives commands and data from the display/MDI unit 34 and delivers them to the CPU 11.

Axis control means 20 and 21 for individual axes receive motion commands for the axes and output commands for the axes to servo amplifiers 22 and 23. On receipt of these commands, the servo amplifiers 22 and 23 drive servomotors 30 and 31 for the axes, respectively. The individual servomotors 30 and 31 contain position/speed sensors. Position/speed feedback signals from the position/speed sensors are fed back to the axis control means 20 and 21, respectively, whereupon position/speed feedback control is performed. In FIG. 3, illustration for the position/speed feedback is omitted.

In the embodiment shown in FIG. 7, the synchronous controller 10 is provided with the axis control means 20 and 21 and the servo amplifiers 22 and 23 that control the servomotors 30 and 31 for synchronous control of the master and slave axes. However, additional axes may be also controlled by only connecting these axis control means, servo amplifiers, and servomotors to the bus 19.

Figure 8:
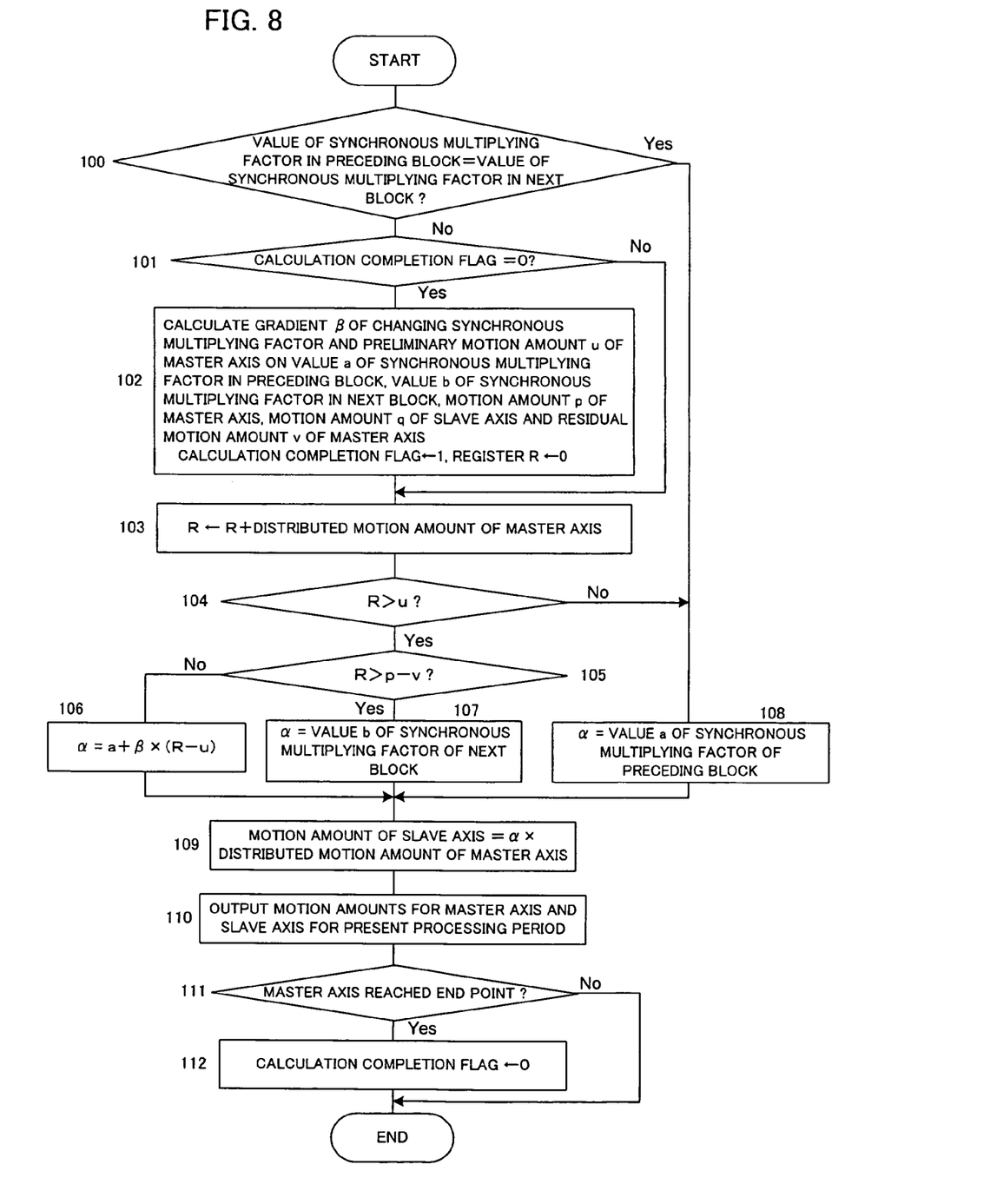
FIG. 8 is an operation flowchart according to the first embodiment of the invention.

FIG. 8 is a flowchart showing processes mainly including synchronous multiplying factor changing in motion command distribution processing for each given period with operation programs executed by the CPU 11.

When the CPU 11 reads out the block concerned, it determines whether or not values of the synchronous multiplying factor in preceding block and the next block are equal (Step 100). If the factors are equal, the synchronous multiplying factor α need not be changed. Therefore, the synchronous multiplying factor α is set to the value for a preceding block (Step 108), the motion amount of the slave axis is obtained by multiplying the motion amount of the master axis for the period concerned by the synchronous multiplying factor α (Step 109), and the motion amounts of the master and slave axes for the period concerned are outputted to the axis control means 20 and 21, respectively (Step 110). Then, it is determined whether or not the end point designated in the block concerned is reached by the master axis (Step 111). If the end point is not reached, the period concerned is terminated. If a motion amount for the master axis to reach the ending point designated in the block concerned is outputted, on the other hand, a calculation completion flag (mentioned later) is set to "0" (Step 112), whereupon the processing for the period concerned terminates.

If it is concluded in Step 100 that the values of the synchronous multiplying factor α changes between the preceding block (block B1) and the read block (block B3), on the other hand, whether or not the calculation completion flag is "0" is determined (Step 101). Since this flag is first set to "0" by initial setting, the program proceeds to Step 102, in which various data designated in the block concerned (block B2) are read out. In this first embodiment, the synchronous multiplying factor in the form shown in FIG. 4 is changed, and the synchronous multiplying factors a and b in the preceding and next blocks, the motion amount p of the master axis, the motion amount q of the slave axis, and the residual motion amount v of the master axis after the completion of changing of the synchronous multiplying factor are supposed to have been designated and read out. Alternatively, the synchronous multiplying factors a and b in the preceding and next blocks may be read out from the individual blocks.

Based on these data, the gradient β of the synchronous multiplying factor is obtained by calculating of equation (8), and the preliminary motion amount u of the master axis from the start of the block concerned for the start of changing of the synchronous multiplying factor is obtained by calculating equation (4). Further, the calculation completion flag is set to "1", and a register R for adding up motion amounts is cleated to cleared to "0" (Step 102).

If the preliminary motion amount u of the master axis from the start of the block concerned for the start of changing of the synchronous multiplying factor is designated in place of the residual motion amount v of the master axis after the completion of changing of the synchronous multiplying factor, moreover, the gradient β of the synchronous multiplying factor is obtained by calculating equation (9). The residual motion amount v of the master axis after the completion of changing of the synchronous multiplying factor is obtained by calculating equation (5).

Then, motion amounts of the master axis for the period concerned (the motion amount of the master axis for the period concerned is obtained by another step of processing (not shown) in the same manner as in the conventional case) are added up in the register R (Step 103).

Subsequently, it is determined whether or not the motion amount u obtained in Step 102 or the designated motion amount u is exceeded by the sum of the motion amounts stored in the register R (Step 104). If obtained or designated motion amount u is not exceeded, the program proceeds to Step 108. Thereupon, the process of Step 108 and the subsequent processes are performed, whereupon motion commands are outputted to the master and slave axes.

Since the calculation completion flag is set to "1" in the next period, the processes of Steps 100 and 101 are performed, whereupon the program proceeds from Step 101 to Step 103. The motion amounts are added up in the register R in Step 103, and whether or not the motion amount u is exceeded by the resulting sum is determined in Step 104. If the motion amount u is not exceeded, the process of Step 108 and the subsequent processes are performed. Thereafter, the processes of Steps 100, 101, 103, 104, 108, 109, 110 and 111 are executed for each period so that the motion amount u is exceeded by the sum in the register R.

If it is concluded in Step 104 that the motion amount u (point B in FIG. 4) is exceeded by the sum stored in the register R, the program proceeds from Step 104 to Step 105, in which whether or not the value (p−v) is exceeded by the sum in the register R is determined. In other words, whether or not the point D in FIG. 4 is exceeded by is determined.

Since the value (p−v) is not exceeded initially, the program proceeds to Step 106, in which the synchronous multiplying factor α for the period concerned is obtained by adding the synchronous multiplying factor a in the preceding block to the product of the gradient β of the synchronous multiplying factor obtained in Step 102 and a value obtained by subtracting the amount u of motion of the master axis during the period between the start of the block concerned and the start of changing of the synchronous multiplying factor obtained in Step 102 from the sum stored in the register R ($\alpha=a+\beta(R-u)$). Based on this obtained synchronous multiplying factor α, the process of Step 109 and the subsequent processes are performed, and motion commands are outputted to the master and slave axes to control them.

From the next period on, the processes of Steps 100, 101, 103, 104, 105, 106, 109, 110 and 111 are performed for each period so that the value (p−v) is exceeded by the sum of the motion amounts stored in the register R, and distributed motion amounts are outputted to the master and slave axes to control them. In consequence, the synchronous multiplying factor is changed with the gradient β by the processing of Step 106, as shown in FIG. 4, as the slave axis is driven.

If the value (p−v) is exceeded by the sum of the motion amounts in the register R (or if the point D of FIG. 4 is exceeded by the master axis) in Step 105, the synchronous multiplying factor α is set to the synchronous multiplying factor b for the next block (Step 107), whereupon the program proceeds to Step 109. From the next period on, the processes of Steps 100, 101, 103, 104, 105, 107, 109, 110 and 111 are executed for each period. If it is concluded in Step 111 that the position of the ending point designated in the block concerned is reached by the master axis, the program proceeds to Step 112, in which the calculation completion flag is set to "0". Thereupon, the processing for the period concerned terminates.

In the first embodiment described above, the gradient β of the synchronous multiplying factor is obtained for the slave axis control by designating the residual motion amount v of the master axis after the completion of changing of the synchronous multiplying factor shown in FIG. 4 or the amount u of motion of the master axis from the start of the block concerned to the start of changing of the synchronous multiplying factor. According to the second embodiment, however, processing similar to the one shown in the flowchart of FIG. 8 is performed even with u=v=0 and the ratio=0.5, as shown in FIG. 5. The second embodiment differs from the first embodiment only in that the undesignated motion amount q or p is obtained in Step 102 according to equation (11) or (12) based on the designated synchronous multiplying factor α in the preceding block, synchronous multiplying factor b in the next block, and motion amount p or q of the master or slave axis, that the gradient β of the synchronous multiplying factor is obtained by calculating equation (13), and that the values u and v are "0" in Steps 104, 105 and 106. Since u=v=0 is given without designation, however, the program proceeds to Steps 100, 101, 102, 103 and 104 in the order named when the block (block B2) in which the synchronous multiplying factor α concerned is changed. Since the value of the register R is greater than u=0, the program proceeds to Steps 105 and 106, in which the synchronous multiplying factor α is changed corresponding to the sum stored in the register R. More specifically, $a=a+\beta R$ is obtained. Then, the process of Step 109 and the subsequent processes are performed. Thus, changing of the synchronous multiplying factor is started immediately when the block in which the synchronous multiplying factor α is changed is read out.

From the next period on, the processes of Steps 100, 101, 103, 104, 105, 106, 109, 110 and 111 are executed for each period so that the motion amount p is exceeded by the value of the register R, that is, the motion amount p designated in the block concerned is reached by the master axis. If it is concluded in Step 111 that the motion amount p or the position of the ending point is reached by the master axis, the program proceeds to Step 112, in which the calculation completion flag is set to "0". Thereupon, the processing for the change of the synchronous multiplying factor terminates.

The following is a description of the processing of the third embodiment shown in FIG. 6 for the case where the gradient β of the synchronous multiplying factor is designated.

In the third embodiment, the designated synchronous multiplying factor a in the preceding block, the synchronous multiplying factor b in the next block, the motion amounts p and q of the master and slave axes, and the gradient β of the synchronous multiplying factor are designated. In Step 102, therefore, the amount u of motion of the master axis from the start of the block concerned to the start of changing the synchronous multiplying factor and the residual motion amount v of the master axis after the completion of changing the synchronous multiplying factor are obtained by calculating equations (14) and (15) based on the designated data. The motion amount u, the residual motion amount v, and the gradient β of the synchronous multiplying factor are obtained in this manner, and the other processes than the process of Step 102 are the same as those of the first embodiment.

What is claimed is:

1. A synchronous controller for controlling a master axis and a slave axis to be synchronized according to a synchronous multiplying factor as a speed ratio of the slave axis to the master axis, comprising:
   means for commanding a change of the synchronous multiplying factor from a first value to a second value;
   means for designating a motion amount of the master axis and a motion amount of the slave axis for the change of the synchronous multiplying factor, and a residual motion amount of the master axis after changing the synchronous multiplying factor;
   means for calculating a gradient of changing the synchronous multiplying factor and a preliminary motion amount of the master axis before changing the synchronous multiplying factor such that the designated motion amount of the slave axis has been completed and the synchronous multiplying factor has changed to the second value when the designated motion amount of the master axis is completed; and
   means for controlling motion of the slave axis with respect to the master axis according to the calculated gradient of changing the synchronous multiplying factor until the synchronous multiplying factor reaches the second value after the calculated preliminary motion amount of the master axis is completed.

2. A synchronous controller for controlling a master axis and a slave axis to be synchronized according to a synchronous multiplying factor as a speed ratio of the slave axis to the master axis, comprising:
   means for commanding a change of the synchronous multiplying factor from a first value to a second value;
   means for designating a motion amount of the master axis and a motion amount of the slave axis for the change of the synchronous multiplying factor, and a preliminary motion amount of the master axis before changing the synchronous multiplying factor;
   means for calculating a gradient of changing the synchronous multiplying factor and a residual motion amount of the master axis after changing the synchronous multiplying factor such that the designated motion amount of the slave axis has been completed and the synchronous multiplying factor has changed to the second value when the designated motion amount of the master axis is completed; and
   means for controlling motion of the slave axis with respect to the master axis according to the calculated gradient of changing the synchronous multiplying factor until the synchronous multiplying factor reaches the second value after the designated preliminary motion amount of the master axis is completed.

3. A synchronous controller for controlling a master axis and a slave axis to be synchronized according to a synchronous multiplying factor as a speed ratio of the slave axis to the master axis, comprising:
   means for commanding a change of the synchronous multiplying factor from a first value to a second value;
   means for designating a motion amount of the master axis for the change of the synchronous multiplying factor;
   means for calculating a motion amount of the slave axis for the change of the synchronous multiplying factor such that the synchronous multiplying factor starts changing simultaneously with motion of the master axis for the designated motion amount and reaches the second value when the designated motion amount of the master axis is completed; and
   means for outputting the designated motion amounts of the master axis and the calculated motion amounts of the slave axis for the change of the synchronous multiplying factor.

4. A synchronous controller for controlling a master axis and a slave axis to be synchronized according to a synchronous multiplying factor as a speed ratio of the slave axis to the master axis, comprising:
   means for commanding a change of the synchronous multiplying factor from a first value to a second value;
   means for designating a motion amount of the slave axis for the change of the synchronous multiplying factor;
   means for calculating a motion amount of the master axis for the change of the synchronous multiplying factor such that the synchronous multiplying factor starts changing simultaneously with motion of the slave axis for the designated motion amount and reaches the second value when the designated motion amount of the slave axis is completed; and
   means for outputting the calculated motion amounts of the master axis and the designated motion amounts of the slave axis for the change of the synchronous multiplying factor.

5. A synchronous controller for controlling a master axis and a slave axis to be synchronized according to a synchronous multiplying factor as a speed ratio of the slave axis to the master axis, comprising:
   means for commanding a change of the synchronous multiplying factor from a first value to a second value;
   means for designating a motion amount of the master axis and a motion amount of the slave axis for the change of the synchronous multiplying factor, and a gradient of changing the synchronous multiplying factor;
   means for calculating a preliminary motion amount of the master axis before changing the synchronous multiplying factor and a residual motion amount of the master axis after changing the synchronous multiplying factor such that the designated gradient of changing the synchronous multiplying factor is obtained; and
   means for controlling motion of the slave axis with respect to the master axis according to the designated gradient of changing the synchronous multiplying factor until a remaining motion amount of the master axis is made equal to the calculated residual motion amount after the calculated preliminary motion amount of the master axis is completed.

* * * * *